Feb. 28, 1950 T. IAVELLI 2,498,889
TRANSMISSION CONTROL
Filed May 28, 1945 2 Sheets-Sheet 1
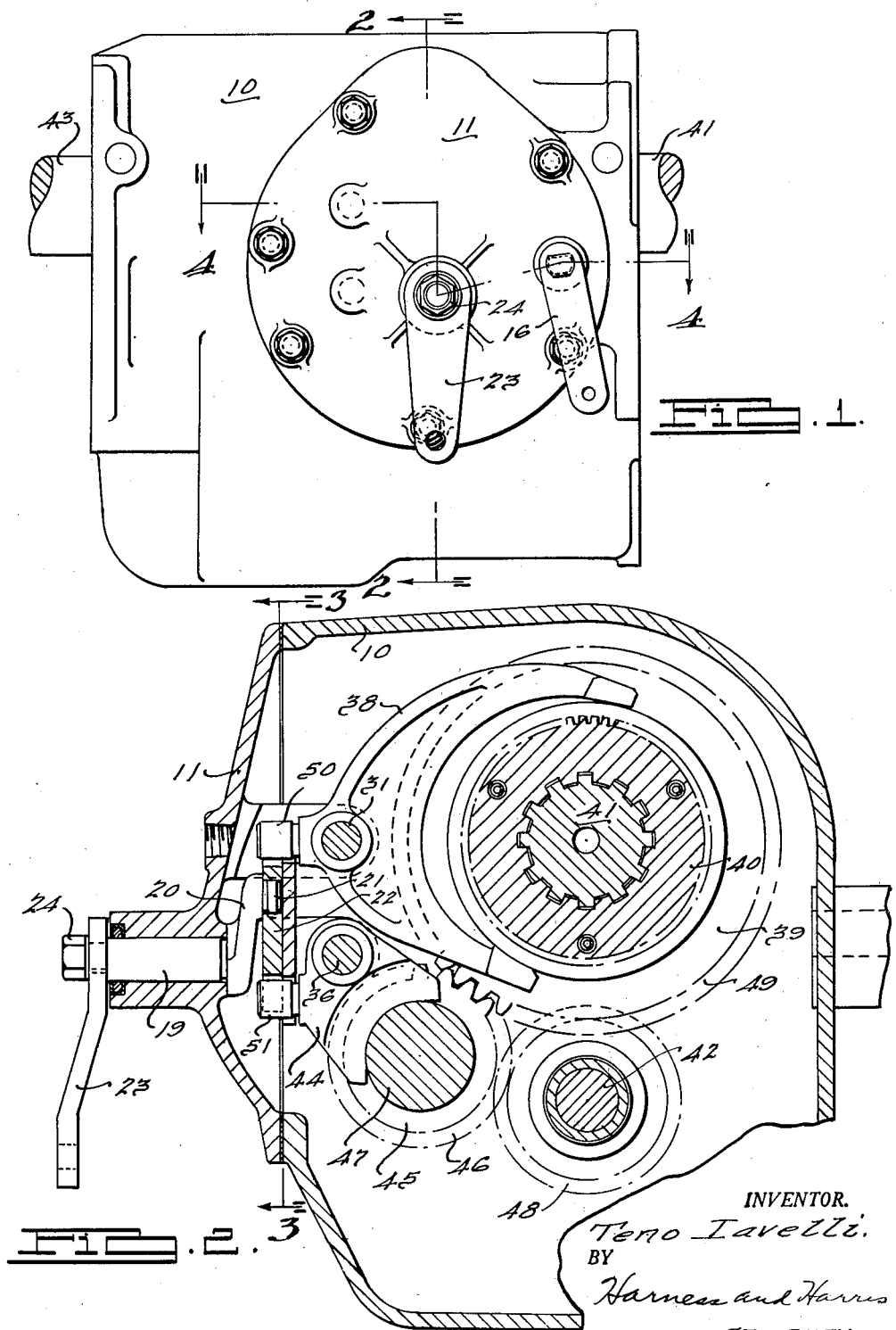
INVENTOR.
Teno Iavelli.
BY
Harness and Harris
ATTORNEYS.

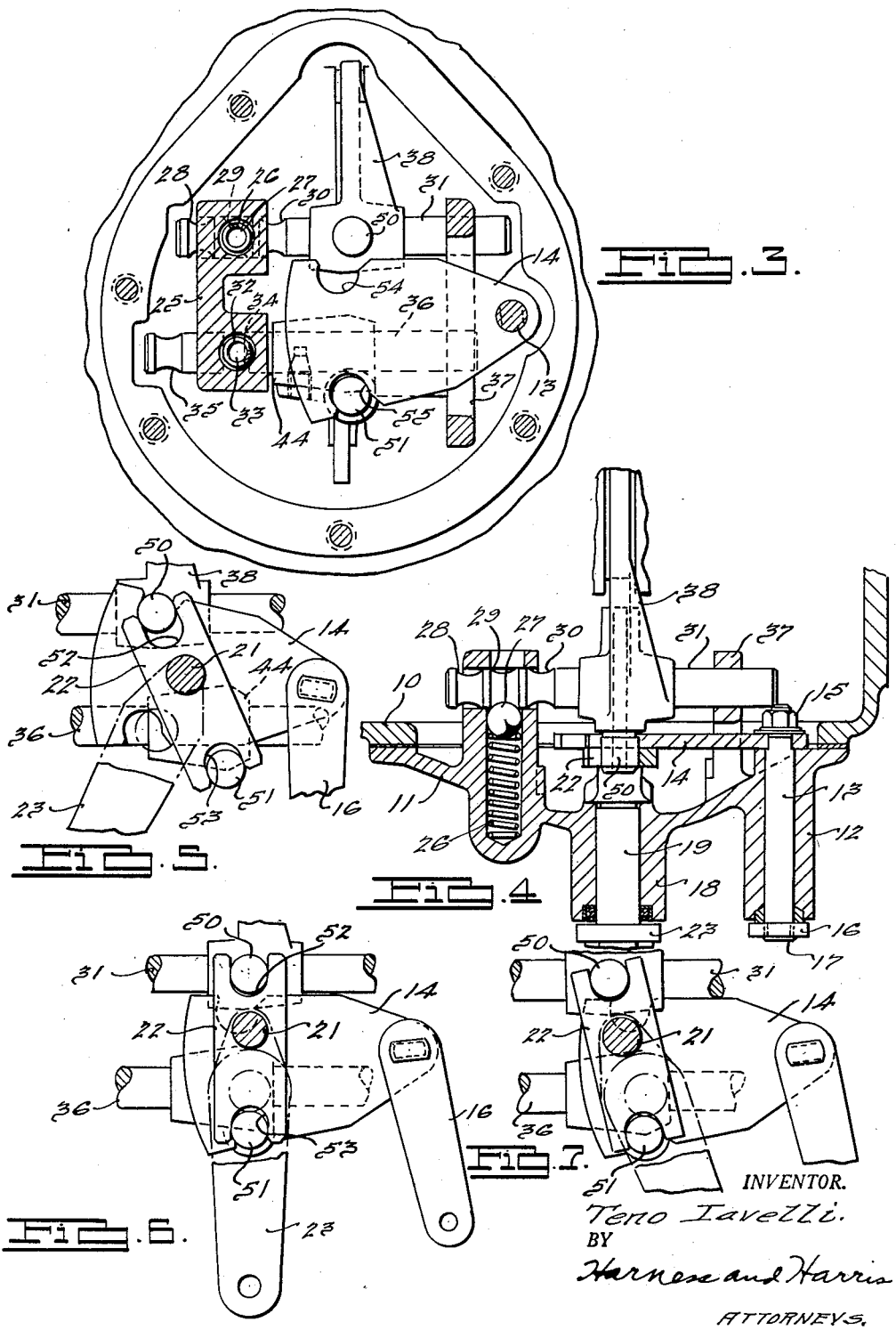

Patented Feb. 28, 1950

2,498,889

UNITED STATES PATENT OFFICE 2,498,889

TRANSMISSION CONTROL

Teno Iavelli, Detroit, Mich., assignor to Chrysler Corporation, Highland Park, Mich., a corporation of Delaware.

Application May 28, 1945, Serial No. 596,280

1 Claim. (Cl. 74—473)

This invention relates to control means for a change-speed transmission. More specifically it relates to an arrangement for locking one control member against movement for preventing a transmission shift in order to permit a transmission shift through movement of another control member.

An object of the present invention is to provide improvements in the aforesaid arrangement. This may involve the provision of slidable rails mounted in a transmission cover for carrying the control members.

Other objects will appear from the disclosure.

In the drawings:

Fig. 1 is a side elevation of a change-speed transmission;

Fig. 2 is a sectional view taken on the line 2—2 of Fig. 1;

Fig. 3 is a sectional view taken on the line 3—3 of Fig. 2;

Fig. 4 is a sectional view taken on the line 4—4 of Fig. 3;

Fig. 5 is a view of a portion of what is shown in Fig. 3, with an actuator added; and Figs. 6 and 7 are similar to Fig. 5 with the parts in different positions.

The reference character 10 designates a transmission casing to which is secured a cover 11. The cover has a tubular portion 12 in which is mounted a rockshaft 13, one end of which is non-circular and fits in a correspondingly shaped opening in a selector 14 clamped to the rockshaft 13 by a nut 15. The other end of the rockshaft 13 is of non-circular shape and fits into a correspondingly shaped opening in a lever 16. The rockshaft 13 is upset as indicated at 17 to retain lever 16. The transmission casing cover 11 also has a tubular portion 18, in which is mounted a rockshaft 19, having at one end an arm 20, provided with a bearing portion 21 fitting in an opening in an actuator 22. The other end of the rockshaft 19 is non-circular and fits in a correspondingly shaped opening in a lever 23. The lever is retained on the rockshaft 19 by a nut 24. The cover 11 has a U-shaped projection 25, as viewed in Fig. 3, in one leg of which there is a bore containing a coil spring 26 urging a ball 27 against any of three grooves 28, 29, and 30 formed on one end of a rail 31. In the other leg of the projection 25 is a bore containing a coil spring 32 like coil spring 26 urging a ball 33 against either of grooves 34 and 35 formed on a rail 36. One end of each of rails 31 and 36 is slidably mounted in a cross bore in a leg of the projection 25, and the other end is slidably mounted in the base of a U 37 secured by the ends of its legs to the cover 11 and formed integral therewith.

A control member or shifter fork 38 is secured to the rail 31 and fits in embracing relation in a groove 39, formed in a clutching member 40, splined on an output shaft 41. When the spring-urged ball 27 engages groove 28 in rail 31, the rail is so positioned as to make the clutching member 40 engage a gear not shown, mounted on shaft 41 and connected indirectly with an input shaft 43 through reduction gears, not shown, and a jack shaft 42. Thus there is indirect drive through the transmission. When the ball 27 engages the groove 30 on rail 31, the rail 31 is so positioned as to make the clutching member 40 engage a gear not shown, secured on the input shaft 43. Thus there is direct drive through the transmission. When, as shown, the ball 27 engages groove 29 on the rail 31, the rail 31 is so positioned as to make the clutching member engage nothing, with the exception of the output shaft 41. Thus the transmission is in neutral.

A control member or shifter fork 44 is secured to the rail 36 and engages in partially embracing relation a groove 45 in a gear 46, mounted on a shaft 47. When the rail 36 is so positioned that the spring-urged ball 32 engages the groove 35 on the rail 36, the control member 44 makes the gear 46 engage both a gear 48 on the jack shaft 42 and a gear 49 drivingly connected with the output shaft 41. This establishes a reverse drive through the transmission. When, as shown in Fig. 3, the ball 32 engages the groove 34, the rail 36 is so positioned as to cause the control member 44 to position the gear 46 out of engagement with the gears 48 and 49, and so the transmission is not in reverse.

The control members 38 and 44 carry projections 50 and 51, respectively, engaging notches or recesses 52 and 53, respectively, formed in the opposite ends of the actuator 22. The selector 14 has at one side a notch or recess 54 engageable with the projection 50 on the control member 38, and at the other side, a recess 55 engageable with the projection 51 on the control member 44.

In the position of Fig. 3 the recess 55 of the selector 14 engages the projection 51 and so prevents shifting of the rail 36 and the control member 38, which could result in placing the transmission in reverse by engagement of the gear 46 with gears 48 and 49. Now the transmission may be shifted from neutral to forward direct drive or to forward indirect drive by angular movement of the actuator 22 about the projection 51 as a pivot effected through appropriate angular movement of the lever 23. The actuator 22 by engagement with the projection 50 on the control member 38 brings about the required movement of the control member 38. When it is desired to shift the transmission to reverse drive, the control member 38 is returned to the neutral position of Fig. 3, in which the projection 50 is ready to receive the recess 54 on the selector 14, when it is swung upwardly from the position of Fig. 3 to the position of Fig. 5. After this has been done, the actuator 22 is moved through the lever 23 about the projection 50 on the control member 38 as a pivot. Such movement causes the control member 44 and the rail 36 to be shifted because of the engagement of the recess 53 in the actuator 22 with the projection 51 on the control member 44. Accordingly, a reverse drive is established by shifting of the gear 46 into engagement with the gears 48 and 49.

The aforesaid apparatus may be summarized as follows: The transmission casing cover 11 carries two parallel rails 31 and 36, which are slidably mounted in the cover 11 and fixedly carry shaft control members 38 and 44, respectively, which by virtue of their mounting on the rails 31 and 36 have straight-line movement with respect to the cover 11. The control members 38 and 44 have projections 50 and 51, which not only are engaged by notches in an actuator 22 which shifts the control members to various positions for various drive ratios of the transmission, but also are engageable with notches in a selector 14 which determines by engagement with the projection on one shift control member that the one control member is held against movement and that the other control member may be moved by the actuator.

I claim:

In a change speed transmission including a casing and a cover, a pair of spaced substantially bar-like rails mounted on the cover for substantially straight line movement substantially parallel to each other, a first control member fixed to one of said rails for movement therewith, a second control member fixed to the other of said rails for movement therewith, said control members being movable from a neutral position to positions establishing predetermined speed ratio drive conditions in the transmission, a lateral projection on each of said control members, the projection on said first control member being over the rail to which it is fixed and the projection on the second control member being transversely offset from the rail to which said second control member is fixed such that the latter rail is transversely intermediate said projections, a selector member pivotally mounted on said cover intermediate said projections and having a body portion provided with a pair of opposite sides extending generally longitudinally of said rails, a locking notch in each of said pair of sides, one notch adapted to be interengaged with the projection of said first control member and the other with the projection of said second control member upon swinging movement of said selector in the direction of the projection to be interengaged when said control members respectively are in their neutral positions, said selector being operable to effect interengagement of the projection of said first control member with said one notch whereby to hold this control member against movement out of its neutral position to a drive establishing position while having its said other notch disengaged from the projection of said second control member to permit movement of the latter from its neutral position to a drive establishing position, and said selector being also operable to effect interengagement of the projection of said second control member with the said other notch of said selector whereby to hold this control member against movement out of its neutral position to a drive establishing position while having its said one notch disengaged from the projection of said one control member to permit movement of said one control member from its neutral position to a drive establishing position, an actuator carried by said cover for pivotal movement intermediate said rails, said actuator having opposite slots one interengaged with the projection of said first control member and the other with the projection of said second control member, and means for operating said actuator, said actuator being adapted to pivot about the projection of the control member held from movement by said selector and to actuate for movement the control member having its projection disengaged from said selector.

TENO IAVELLI.

REFERENCES CITED

The following references are of record in the file of this patent:

UNITED STATES PATENTS

| Number | Name | Date |
| --- | --- | --- |
| 2,277,830 | Phillips | Mar. 31, 1942 |
| 2,299,889 | Fishburn | Oct. 27, 1942 |